Figure 1:
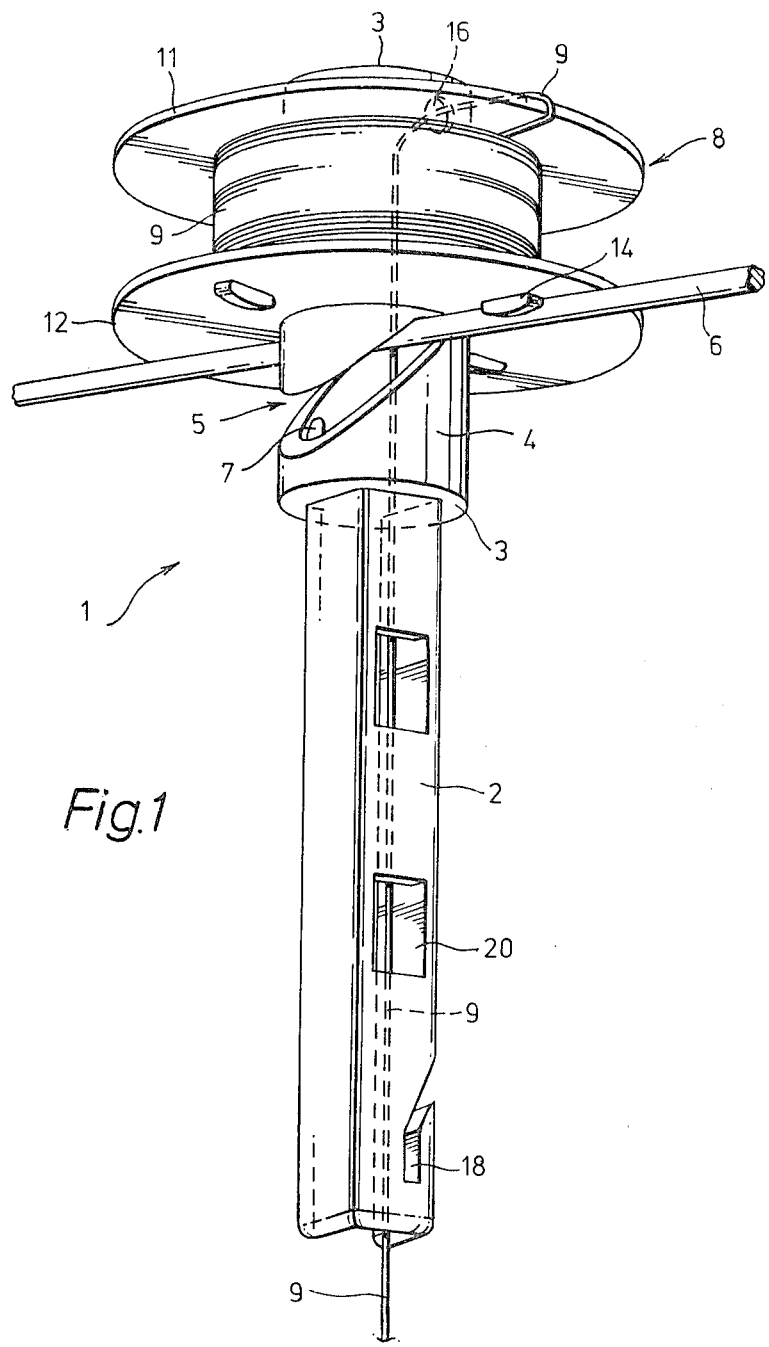

United States Patent [19]

Flynn

[11] 4,254,579
[45] Mar. 10, 1981

[54] DEVICE FOR SUPPORTING AND TRAINING PLANTS

[76] Inventor: Richard Flynn, Convent Road, Rush, County Dublin, Ireland

[21] Appl. No.: 952,255

[22] Filed: Oct. 17, 1978

[30] Foreign Application Priority Data

Oct. 18, 1977 [IE] Ireland .................................. 2129/77

[51] Int. Cl.³ ............................................. A01G 17/08
[52] U.S. Cl. ........................................... 47/46; 47/47; 242/134; 242/141
[58] Field of Search ............ 242/134, 136, 137, 137.1, 242/138, 139, 140, 141, 129.8, 130.2; 47/44, 46, 47, 45

[56] References Cited

U.S. PATENT DOCUMENTS

| | | | |
|---|---|---|---|
| 294,240 | 2/1884 | Judd | 47/46 |
| 882,244 | 3/1908 | Gibson | 242/136 X |
| 1,245,403 | 11/1917 | Trevor | 242/141 |
| 2,226,430 | 12/1940 | Handzelek | 242/129.8 X |
| 2,339,311 | 1/1944 | Young | 242/96 |
| 2,389,529 | 11/1945 | Messenger et al. | 242/137.1 |
| 3,518,791 | 7/1970 | Carson et al. | 47/47 |
| 3,834,647 | 9/1974 | May | 242/130.2 |
| 4,050,187 | 9/1977 | Geiger et al. | 47/45 |

FOREIGN PATENT DOCUMENTS

| | | | |
|---|---|---|---|
| 281028 | 1/1914 | Fed. Rep. of Germany | 47/44 |
| 7713984 | 6/1978 | Netherlands | 47/44 |
| 109878 | 4/1925 | Switzerland . | |
| 994096 | 6/1965 | United Kingdom . | |

*Primary Examiner*—Steven A. Bratlie
*Attorney, Agent, or Firm*—Young & Thompson

[57] ABSTRACT

The invention relates to a device for supporting and training plants and in particular for layering tomato plants. It comprises a longitudinal stem portion formed with an integral hook which is adapted to grip and slide along a support wire which is mounted above and parallel to the plant row, and a spool rotatable about a cylindrical bearing surface of the stem portion. The spool carries a support cord which passes upwardly from the spool, through an aperture in the top of the stem portion and down through the hollow interior of the stem portion to where it is tied to the stem of the tomato plant. When it is desired to layer the plant the stem portion is moved along the wire and simultaneously the spool is rotated to pay out sufficient cord to layer the plant. Rotation of the spool is controlled by means of ribs on a flange of the spool which engage with the horizontal support wire.

10 Claims, 8 Drawing Figures

DEVICE FOR SUPPORTING AND TRAINING PLANTS

The present invention relates to a method and device for supporting and training plants. More particularly the invention is concerned with a tomato plant layering device.

In modern glasshouse growing of tomato plants it has been found that an increased yield of crop is obtained if the plants are layered along the plant rows. In this system a support wire is positioned above each row and runs parallel to the row. The top 4 or 5 ft. (about 1.2 to 1.5 m) of each tomato plant, on which the greater part of the crop appears, is kept substantially upright by means of a length of cord, which is tied to the stem of the plant where it leaves the growing medium, and which is wound around a flat layering peg which is hooked to the support wire. The stem of the tomato plant is trained around the vertical support cord. As the plant grows the peg is unhooked periodically, a length of the cord is paid out, and the peg is re-hooked on the wire a short distance along the plant row with the result that the new growth of the plant is kept upright while a spent portion of the stem of the plant is laid on the ground and extends longitudinally along the plant row. However, a tomato plant may increase in length by up to about 25 ft. (7.6 m) during a growing season and so during this period the conventional layering pegs must be unhooked at intervals of about ten days which is quite time consuming. It is also a difficult operation as the whole weight of the plant must be taken in one hand while the cord is wound from the peg with the other.

An arrangement for layering tomato plants utilizing a plurality of vertical wires provided with lateral hook-like extensions is described in British Pat. No. 1,276,944.

I am also aware of British Pat. No. 994,096 which relates to a device for tying-up growing plants, including tomato plants, having a wire or string attached at one end to the plant to be supported and at the other end to a horizontal support wire above the plant, means being provided for keeping the vertical string taut. In a preferred embodiment there is provided a rotatable winding drum for the string which is continuously biased by a spring to rotate so as to wind-up the string. It is quite clear that such an arrangement would not be suitable for use in layering tomato plants because when layering it is necessary to pay out the string and not to wind it up.

According to the present invention a plant layering device comprises a body portion having a hook portion which is adapted to grip a horizontal support wire mounted above and substantially parallel to a plant row such that the body portion is slidable along the horizontal support wire, and in combination therewith a spool which is rotatable around the body portion and which is adapted to carry and pay out a plant support cord as the device is moved along the support wire such that the stem of the plant is layered along the plant row.

Preferably, means are provided for controlling unwinding of the support cord from the spool. Preferably, the control means stops, checks or retards rotation of the spool and may comprise ribs or other protuberances on an outer surface of the spool which in one position of the spool engage with the horizontal support wire to prevent or retard rotation of the spool. Alternatively, or in addition, the control means can include a friction brake either between the spool and the surface of rotation or between the support cord and the body portion. Suitably, the body portion is hollow and the plant support cord leaving the spool passes through the hollow interior of the body portion to the tomato plant.

In a preferred embodiment the peripheral edge of at least one flange of the spool is rounded to minimise friction between the flange and the support cord, and the support cord passing from the spool is directed to the hollow interior of the body portion by means of a spout which extends laterally from the body portion. The device of the invention offers many advantages over the conventional layering peg. It is not necessary to unhook the device from the overhead wire, as is the case with the conventional peg. When layering of the plant is required all the grower need do is to grasp the device in one hand, and allow the necessary amount of cord to pay out from the spool as he slides the device along the support wire. Because the grower can control rotation of the spool he can gauge the exact amount of cord to release so as to achieve optimum results and to ensure that the end of the plant is kept upright. Only one hand is needed to operate the device and so the other hand is free to train the plant around the support cord so that layering and training can be carried out simultaneously and, if necessary, can be combined with pinching-out of side shoots. The device of the invention considerably reduces the labour involved in tomato growing and provides for improved crop management.

Although the device of the invention is particularly suitable for use in layering tomato plants, it can be used for layering other plants, for example cucumber plants.

Figure 2:
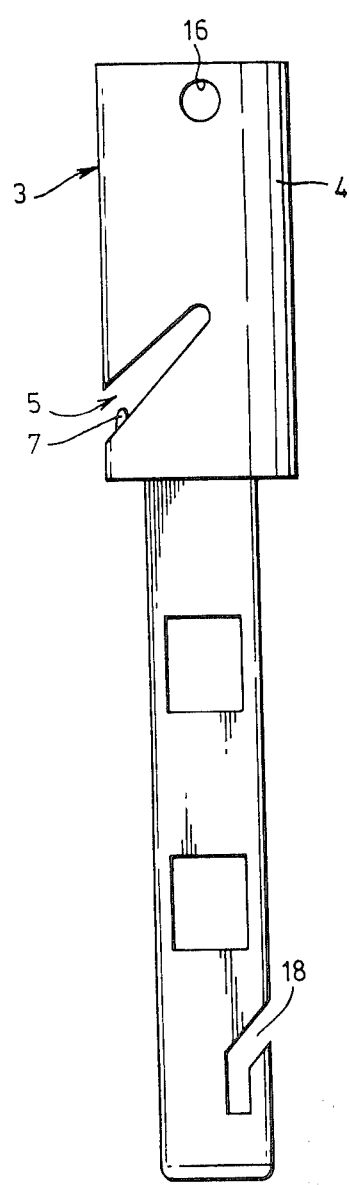
Figure 3:
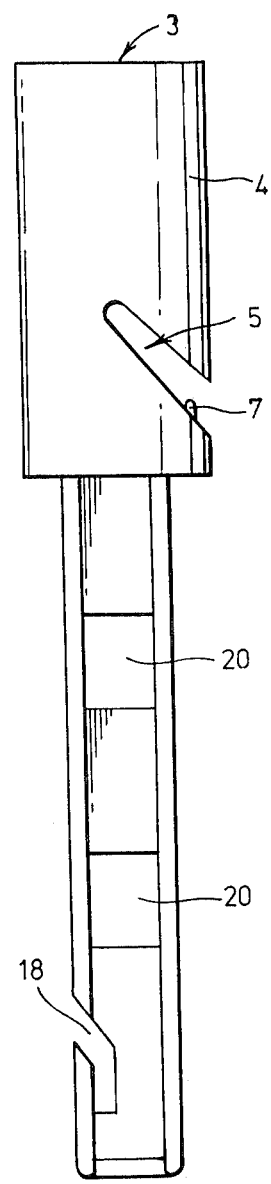
Figure 4:
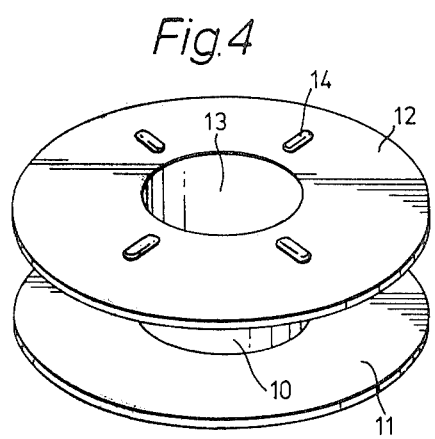
Figure 8:
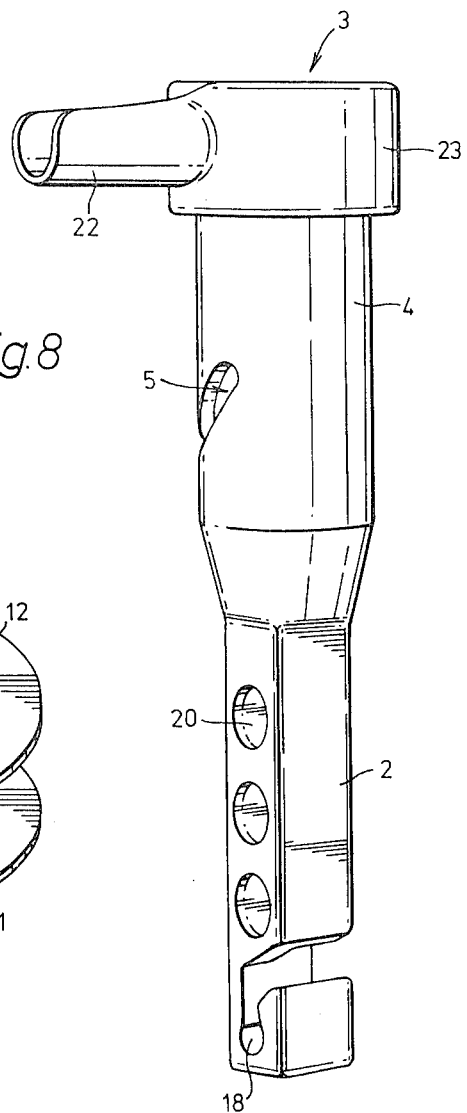
Figure 5:
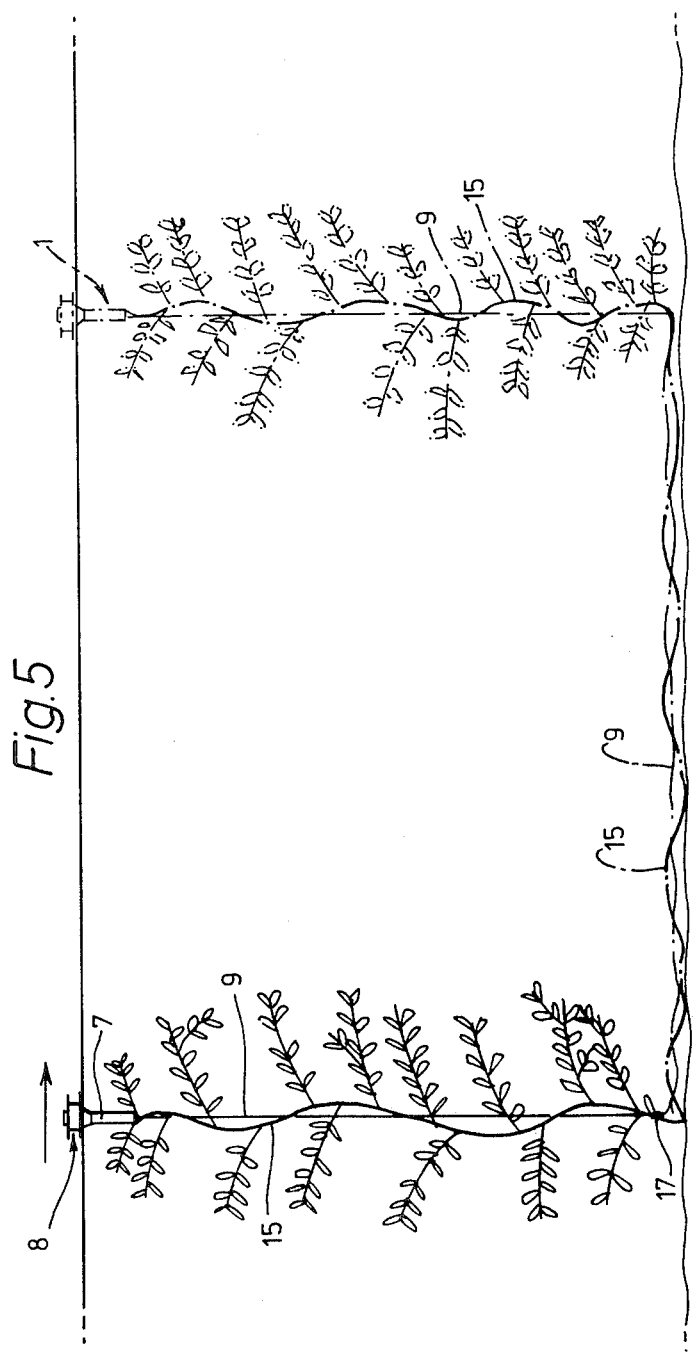
Figure 6:
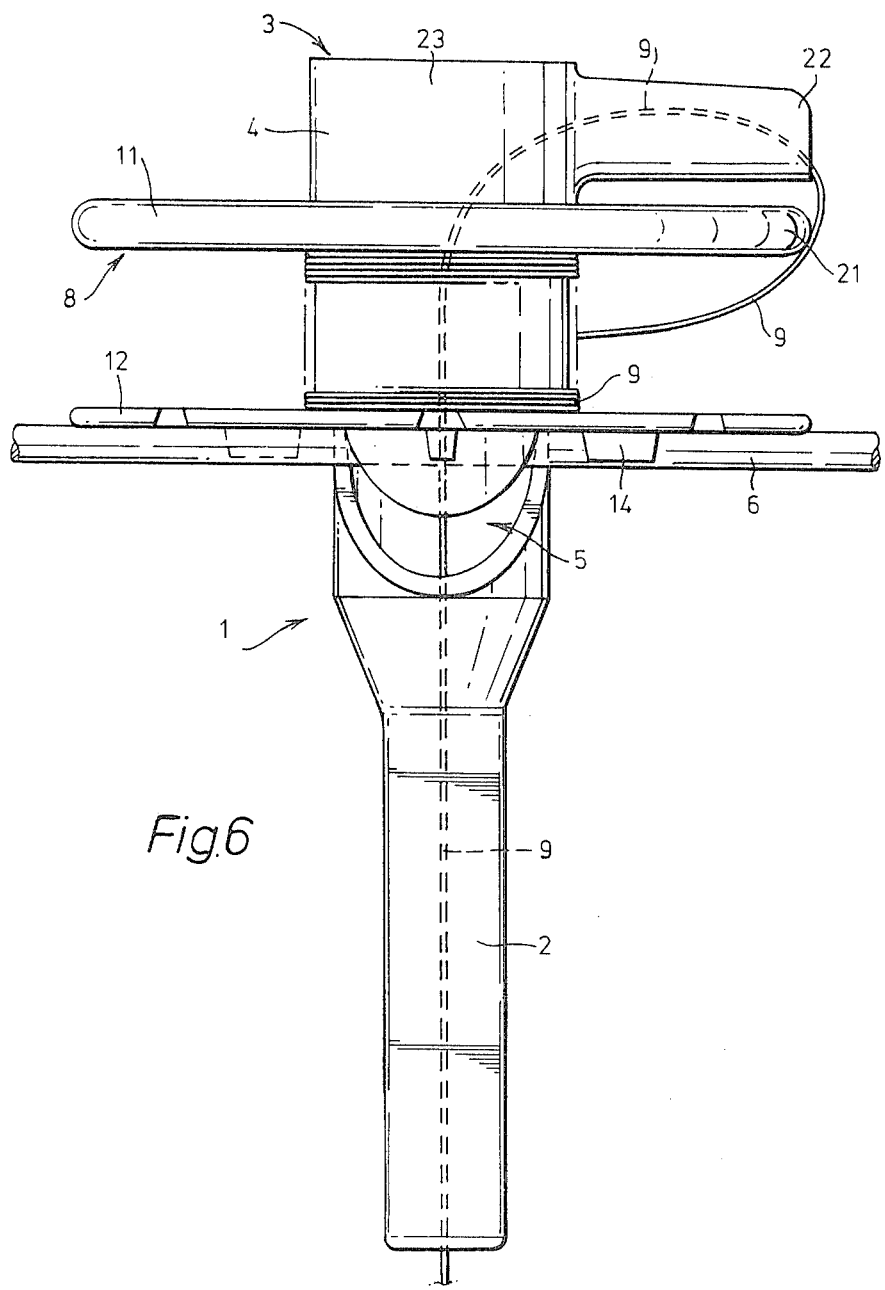
Figure 7:
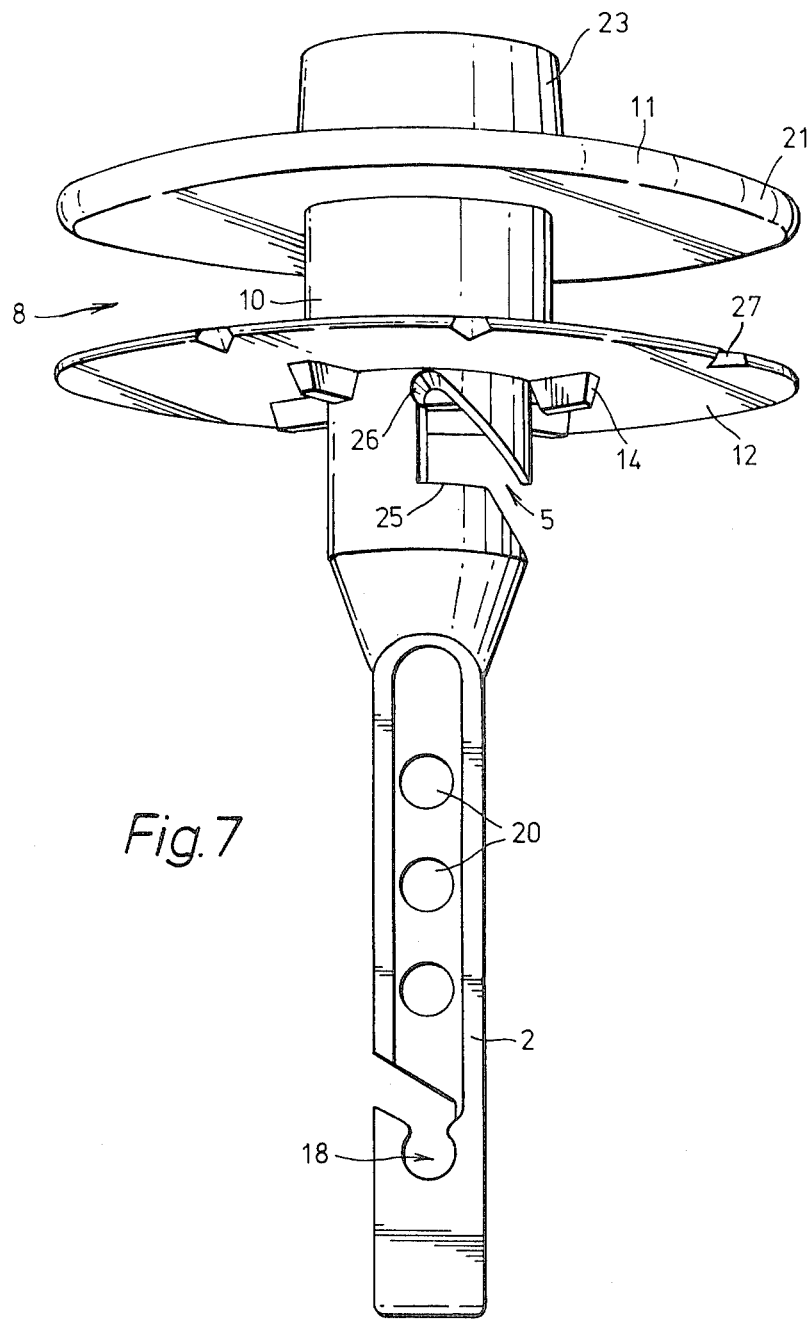

Some embodiments of the invention are hereinafter described in more detail with reference to the accompanying drawings, wherein:

FIG. 1 is a perspective view of one embodiment of the invention showing the device hooked on to a horizontal support wire and the spool in position on the body portion, FIG. 2 is a side elevation of one side of the body portion of the device, FIG. 3 is a side elevation of the other side of the body portion, FIG. 4 is a perspective view showing the underside of the spool, FIG. 5 is a diagrammatic illustration to a smaller scale of the unit in use, FIG. 6 is a front elevation of a second embodiment of the invention hooked on to a support wire, FIG. 7 is a perspective view from below of the device of FIG. 6, and FIG. 8 is a side elevation of the body portion of the device of FIG. 7 with the spool removed.

Referring to FIGS. 1 to 5 of the drawings, a tomato plant layering device comprises a longitudinally extending stem portion 1 having a channel-shaped handle 2 and an upper tubular portion 3 the outer surface of which forms a cylindrical bearing surface 4. The tubular portion 3 has a hook portion 5 formed integrally therein. The hook portion 5 is in the form of a mouth-shaped opening in the wall of the tubular portion 3 and may be formed by making an upwardly directed cut in the tube portion. The mouth-shaped opening is inclined upwardly from the outer surface 4 of the tubular portion 3 towards the longitudinal axis of the stem portion. As shown in FIG. 1 the mouth-shaped hook is adapted to grip a horizontal plant support wire 6. Preferably, the device is made from a plastics material so that the hook 5 is sufficiently resilient to grip the wire tightly so as to prevent accidental slip of the device along the wire but yet which enables the device to slide along the wire when moved by hand. The hook 5 may have an upwardly directed flexible tongue 7 which is deflected by the wire 6 when the unit is being pushed on to the wire 6 but which prevents the device from accidentally dropping off the wire.

The device includes a spool 8 on which is wound a plant support cord or tape 9. A polypropylene tape has been found to be suitable and up to four years supply of cord and up to ten years supply of tape can be retained on the spool. The spool consists of a cylindrical drum portion 10 (see FIG. 4) and two annular side flanges 11, 12. The diameter of the bore 13 of the spool is slightly greater than the diameter of the bearing surface 4 of the stem portion, such that the spool fits snugly over the stem portion and is rotatable thereon (see FIG. 1). The underside flange 12 of the spool is formed with a plurality of protruberances or ribs 14 which engage with the wire when the spool is resting on the wire as shown in FIG. 1. Thus, when the spool is rotated the interengagement of the ribs 14 and the wire acts as a ratchet arrangement to control the rotation of the spool. The plant support cord 9 leaving the spool initially pass upwardly around the flange 11 of the spool, into an aperture 16 in the wall of the tubular portion 3, down through the hollow interior of the body portion to where it is tied to the plant.

The method of using the device of the invention is illustrated in FIGS. 1 and 5, FIG. 5 shows a plant support wire 6 which is mounted in a glasshouse above, and parallel to, a crop row in a conventional manner. At the beginning of the growing season the device is hooked on to the support wire, as described above in relation to FIG. 1, at a position directly above where a tomato plant 15 emerges from the growing medium. The end of the plant support cord 9 is passed from the spool 8, through an aperture 16 in the wall of the tube, down through the tube 3 to the base of the stem of the plant to which it is tied at 17. The plant stem is trained around the cord in conventional manner. The combination of the ratchet arrangement and the friction which results from the cord passing upwardly through the aperture 16 and down through the tube 3 prevents accidental rotation of the spool. However, as an additional safeguard to ensure that the spool will not accidentally pay out cord, the cord may be hitched to a hook 18 formed in the lowermost end of the stem portion 2. The fact that the support cord 9 passes upwardly from the spool and then downwardly through the hollow interior of the body portion assures that the device remains upright on the support wire. As the tomato plant grows it is necessary to lay the spent stem of the plant longitudinally along the crop row so as to keep the top 4 to 5 ft. (about 1.2 to 1.5 m) of fresh growth in an upright position. To achieve this with the layering unit of the invention all the grower has to do is to periodically unhitch the cord 9 from the hook 18, grasp the handle 2 in one hand and with the thumb rotate the spool 8 to allow the desired amount of cord to drop and simultaneously to slide the unit a short distance along the wire in the direction of the arrow in FIG. 5, until the topmost part of the plant is again vertical. For the sake of clarity only one plant is shown in FIG. 5 of the drawings, the plant being shown in full lines at an early stage in its growth and in broken lines at a later stage in its growth. It will be appreciated that the layering can be carried out at the same time as other crop management procedures such as the pinching of side shoots, so that little extra labour is involved.

The layering device may be injection moulded from plastics material such as polypropylene. In order to minimise the amount of rigid plastics used, apertures 20 may be formed in the stem portion 2 although it will be appreciated that these do not have any functional purpose. Although not shown in the drawings, the uppermost flange 11 of the spool may also be provided with either a single or multiple ribs, so that a plurality of spools may be interconnected, flange to flange, for the purpose of winding the cords 9 thereon in the cording of the spools before they are combined with the body portion. The embodiment illustrated in FIGS. 6 to 8 of the drawings is basically similar to that described above and like reference numerals denote like parts. However, in this embodiment the peripheral edge 21 of the upper flange 11 has been thickened and rounded so as to allow the cord 9 to pass more freely over the edge. Travel of the cord 9 through the aperture 16 is also facilitated by means of a spout 22 which extends from a boss 23 (see FIG. 8) formed on the top of the tubular portion 3. The spout 22 extends as far as the periphery of the flange 21 and so allows the cord 9 to pass around the edge 21 without undergoing a sharp angular change in direction.

In this embodiment the tongue 7 is dispensed with, and the mouth 5 is formed with an angular step 25 (see FIG. 7) and an upper rounded recess 26 which is adapted to receive the support wire 6. The wire 6 is slightly larger in diameter than the initial width of the mouth 5 and so the wire must be forced past the lips of the mouth which are sufficiently flexible to allow entry of the wire but which subsequently prevent the device from falling off the wire.

In use when the device is in position on the support wire 6 with the wire positioned in the rounded recess 26 rotation of the spool is prevented by coaction of the ribs 14 with the support wire 6. When it is desired to layer a tomato plant, the stem portion 2 is grasped in the hand and pushed up slightly relative to the support wire 6 resulting in the support wire 6 coming out of engagement with the recess 26 and moving into the region of the step 25. The spool is then free to rotate as the ribs 14 no longer engage with the support wire. The spool will automatically pay out cord under the weight of the tomato plant. When sufficient cord has been paid out rotation of the spool is stopped by pulling the device downwardly until the recess 26 is again in engagement with the support wire 6.

It will be noted from FIGS. 7 and 8 of the drawings that in this embodiment the lower hook 18 is rounded. This has the advantage that the device can be hung upside down on the support wire 6 by engaging the lower hook 18 on the wire 6. It has been found that the device will pay out cord in this position, rotation of the spool being controlled to an extent by engagement of the cord 9 in notches 27 cut in the periphery of its flange 12 of the spool. The mouth of the hook 18 is restricted in width to enable the lower hook 18 to snap on to the support wire 6 and this prevents the device from accidentally falling off the wire.

It will be appreciated that other changes may be made in the construction of the device without departing from the scope of the invention. For example, the hook portion 5 can be arranged above the spool so that the spool rotates below the support wire. The spool can be prevented from moving down the body portion by means of a collar or protruberance on the bearing surface or by means of a thickening of the body portion.

I claim:

1. A plant layering device comprising a body portion which has a hook portion which is adapted to grip a horizontal support wire mounted above and substantially parallel to a crop row such that the body portion is slidable along the horizontal wire, and in combination therewith a spool which is rotatable about the body portion and which is adapted to carry and pay out a plant support cord as the body portion is moved along the support wire such that the stem of the plant is layered along the plant row, and means responsive to downward pressure on the spool to retard rotation of the spool.

2. A device according to claim 1, wherein control means are provided for controlling unwinding of the support cord from the spool.

3. A device according to claim 2, in which the control means comprises means for stopping, checking or retarding rotation of the spool.

4. A device according to claim 1, wherein the body portion has a cylindrical bearing surface which engages within a bore of the spool such that the spool can rotate about the bearing surface and the body portion includes a hook portion formed integrally therein.

5. A device according to claim 4, wherein the body portion includes a handle which is grippable by the hand to facilitate sliding of the device along the support wire.

6. A plant layering device comprising a body portion which has a hook portion which is adapted to grip a horizontal support wire mounted above and substantially parallel to a crop row such that the body portion is slidable along the horizontal wire, and in combination therewith a spool which is rotatable about the body portion and which is adapted to carry and pay out a plant support cord as the body portion is moved along the support wire such that the stem of the plant is layered along the plant row, the body portion having a cylindrical bearing surface which engages within a bore of the spool such that the spool can rotate about the bearing surface, the body portion including a hook portion formed integrally therein, an outer surface of the spool having ribs or other protuberances which in one position of the spool are adapted to engage with the horizontal support wire to retard or prevent rotation of the spool.

7. A device according to claim 6, wherein the body portion is hollow and the plant support cord leaving the spool passes down through the hollow interior of the body portion to the tomato plant.

8. A device according to claim 6, wherein in the peripheral edge at least one flange of the spool is rounded to reduce friction between the flange and the support cord.

9. A device according to claim 7, wherein the support cord is directed to the interior of the body portion by means of a spout which extends outwardly from the body portion.

10. A plant layering device comprising a body portion which has a hook portion which is adapted to grip a horizontal support wire mounted above and substantially parallel to a crop row such that the body portion is slidable along the horizontal wire, and in combination therewith a spool which is rotatable about the body portion and which is adapted to carry and pay out a plant support cord as the body portion is moved along the support wire such that the stem of the plant is layered along the plant row, the body portion having a cylindrical bearing surface which engages within a bore of the spool such that the spool can rotate about the bearing surface, the body portion including a hook portion formed integrally therein, the body portion including a handle which is grippable by the hand to facilitate sliding of the device along the support wire, including a second hook by means of which the device can be hung upside down on the support wire.

* * * * *